US009990588B2

(12) United States Patent
Tanuma et al.

(10) Patent No.: US 9,990,588 B2
(45) Date of Patent: Jun. 5, 2018

(54) SYSTEM FOR PREDICTING AMOUNT OF PRODUCTION AND METHOD FOR PREDICTING AMOUNT OF PRODUCTION (71) Applicant: Hitachi, Ltd., Tokyo (JP)

(72) Inventors: Iwao Tanuma, Tokyo (JP); Shouchun Peng, Tokyo (JP); Hiroshi Yoshikawa, Tokyo (JP); Masami Yamasaki, Tokyo (JP); Umeshwar Dayal, Santa Clara, CA (US); Ravigopal Vennelakanti, Santa Clara, CA (US); Anshuman Sahu, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 14/662,320

(22) Filed: Mar. 19, 2015

(65) Prior Publication Data
US 2016/0273314 A1 Sep. 22, 2016

(51) Int. Cl.
G06N 99/00 (2010.01)
G06Q 50/02 (2012.01)
G06Q 10/06 (2012.01)
G06N 7/00 (2006.01)
E21B 43/00 (2006.01)

(52) U.S. Cl.
CPC ........... *G06N 99/005* (2013.01); *E21B 43/00* (2013.01); *G06N 7/005* (2013.01); *G06Q 10/067* (2013.01); *G06Q 50/02* (2013.01)

(58) Field of Classification Search
CPC ... G06N 5/02; G06N 5/04; G06N 5/048; G06N 7/005; G06N 99/005; G06Q 10/067; G06Q 50/02; E21B 43/00; E21B 41/0092
USPC ......................................................... 706/11
See application file for complete search history.

(56) References Cited

U.S. PATENT DOCUMENTS

| | | | |
|---|---|---|---|
| 2009/0260880 A1* | 10/2009 | Thambynayagam | ... E21B 43/00 175/45 |
| 2010/0185427 A1* | 7/2010 | Tilke | ....................... E21B 43/00 703/10 |
| 2015/0060058 A1* | 3/2015 | Morris | ................... E21B 43/267 166/250.02 |
| 2016/0245065 A1* | 8/2016 | Gray | ....................... G01V 1/303 |

* cited by examiner

*Primary Examiner* — David Misir
(74) *Attorney, Agent, or Firm* — Mattingly & Malur, PC (57) ABSTRACT Provided is a production amount prediction system including: a storage unit which stores a production amount prediction model which is based on resources information including a resources amount obtained in a previously drilled wellbore and a resources recovery probability in the vicinity thereof; an input unit which receives a trajectory coordinate of a planned wellbore as an input; a production amount prediction unit which calculates a production amount of the planned wellbore based on the production amount prediction model by using a degree of influence of the previous wellbore on the planned wellbore as at least one parameter; and a display unit which displays the production amount of resources of the planned wellbore calculated by the production amount prediction unit.

4 Claims, 10 Drawing Sheets

| WELLBORE ID | PRODUCTION STARTING DATE | LIMITED RESOURCES AMOUNT Ci | PRODUCTION COEFFICIENT Ki |

FIG. 2B

| WELLBORE ID | WELLBORE TRAJECTORY DATA |

FIG. 2C

| WELLBORE ID | NUMBER OF STAGE (N) | FRACTURING STARTING POINT COORDINATE OF STAGE 1 | FRACTURING WATER PRESSURE OF STAGE 1 | ⋯ | FRACTURING STARTING POINT COORDINATE OF STAGE N | FRACTURING WATER PRESSURE OF STAGE N |

| BLOCK ID | BLOCK AREA VERTEX 1 | BLOCK AREA VERTEX 2 | RESOURCES CONTENT |

FIG. 2G

| WELLBORE ID | PARAMETER ($\mu_{1i}, \Lambda_{1i}$) OF GAUSSIAN DISTRIBUTION OF STAGE 1 | RELATIVE WEIGHTING VALUE ($w_{1i}$) OF PROBABILITY DISTRIBUTION OF STAGE 1 | ... | PARAMETER ($\mu_{Ni}, \Lambda_{Ni}$) OF GAUSSIAN DISTRIBUTION OF STAGE N | RELATIVE WEIGHTING VALUE ($w_{Ni}$) OF PROBABILITY DISTRIBUTION OF STAGE N |

FIG. 2H

| WELLBORE ID | PLAN ID |

SYSTEM FOR PREDICTING AMOUNT OF PRODUCTION AND METHOD FOR PREDICTING AMOUNT OF PRODUCTION

BACKGROUND OF THE INVENTION

1. Field of the Invention

The present invention relates to a system for predicting amount of production and a method for predicting amount of production for a wellbore of resources extraction applications.

2. Description of the Related Art

As a background art, there is a technique disclosed in US-2010/0185427-A. US-2010/0185427-A discloses a technique for making a development plan for oil or gas by using geological stratum data and the like. US-2010/0185427-A discloses a technique for predicting a total production amount of oil or gas as a 3D object based on distribution information of the oil or gas to make a development plan.

SUMMARY OF THE INVENTION

In a technique disclosed in US-2010/0185427-A, a total production amount of each wellbore is independently predicted and calculated.

However, since resources included in the same land are produced by extrusion into each wellbore, the production amounts of the wellbore influence each other according to the interval between the wellbores. Therefore, a technique for predicting amount of production by considering the influence to make a drilling plan is required.

There is disclosed a production amount prediction system including: a storage unit which stores a production amount prediction model which is based on resources information including a resources amount obtained in a previously drilled wellbore and a resources recovery probability in the vicinity thereof; an input unit which receives a coordinate of trajectory of a planned wellbore as an input; a production amount prediction unit which calculates a production amount of the planned wellbore based on the production amount prediction model by using a degree of influence of the previous wellbore on the input planned wellbore as at least one parameter; and a display unit which displays the production amount of resources of the planned wellbore calculated by the production amount prediction unit.

It is possible to make a drilling plan with a good recovery efficiency of an amount of production by predicting the amount of production by considering influence between wellbores.

DESCRIPTION OF THE PREFERRED EMBODIMENTS

Hereinafter, embodiments of the present invention will be described in detail with reference to the drawings.

Figure 1:
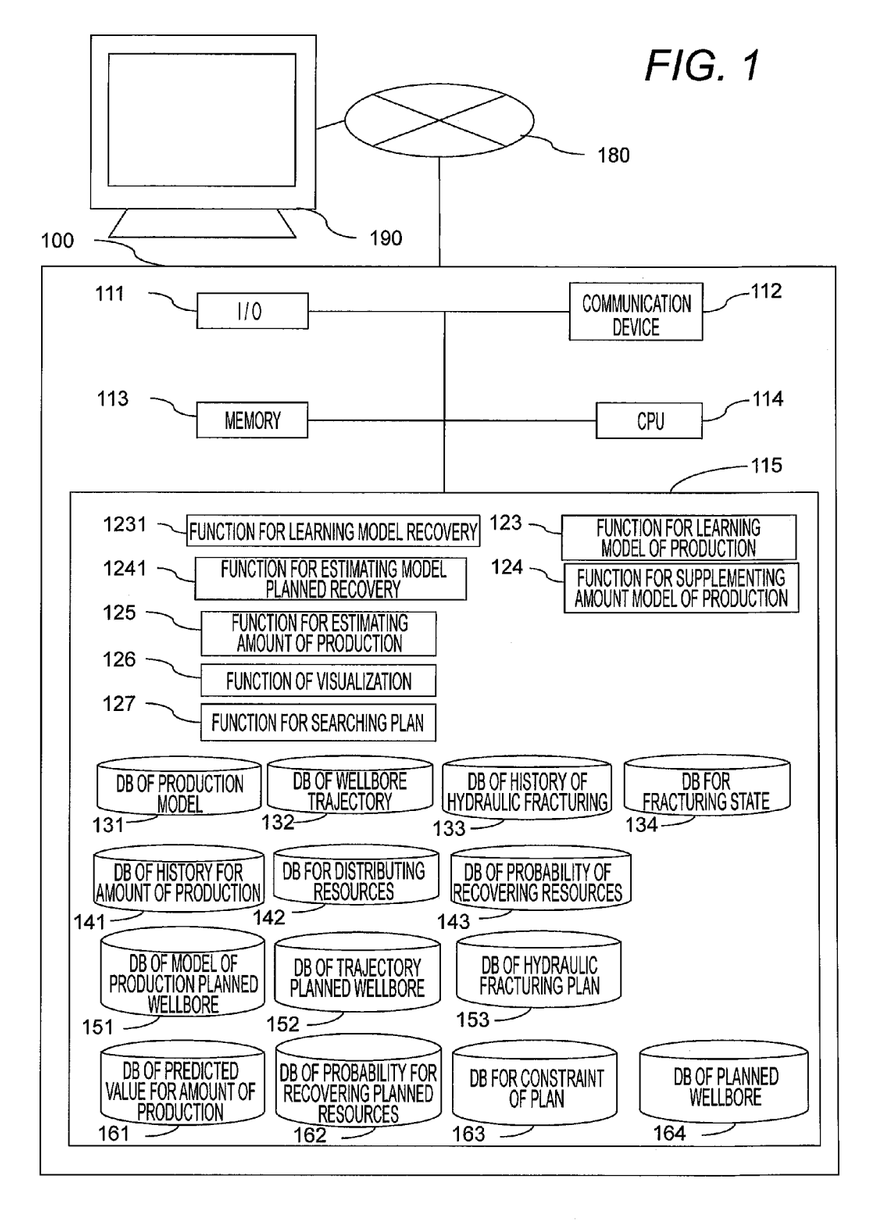
FIG. 1 is a diagram illustrating a system configuration according to an embodiment.

FIG. 1 is a diagram illustrating an example of a network configuration including a system for predicting amount of production 100 according to an embodiment. The system for predicting amount of production 100 illustrated in FIG. 1 is a computer system which enables production amount prediction by considering interference of recovery efficiency between wellbores by estimating an amount of production of each wellbore based on a mathematical model where the wellbores share resources.

The system for predicting amount of production 100 is connected to a network 180 and is capable of communicating data with a client terminal 190. The client terminal 190 accesses the system for predicting amount of production 100 and performs various process of receiving data input from a wellbore developing planning person and a wellbore manager and a process of displaying data obtained from the system for predicting amount of production 100 on a display or the like by using an input interface such as a keyboard or a mouse.

The system for predicting amount of production 100 is configured to include, as hardware components, a storage device 115 configured with a nonvolatile storage device such as a hard disk drive, a memory 113 configured with a volatile storage device such as a RAM, a CPU 114 (calculation device) which reads out a program stored in the storage device 115 to the memory 113 to execute the program, performs overall control of the system itself, and performs a preliminary control process of various determinations and calculations, and a communication device 112 which connects the system for predicting amount of production 100 to the network 180 to perform a process of communicating with other devices.

The above-described program describes various functions of a function for learning model of recovery 1231, a function for learning model of production 123, a function for estimating model planned recovery 1241, a function for interpolationing model of production 124, a function for estimating amount of production 125, a function of visualization 126, and a plan searching function 127.

The hard disk drive 115 includes a database of production model 131, a database of wellbore trajectory 132, a database of history of hydraulic fracturing 133, a database for fracturing state 134, a database of history for amount of production 141, a database for distributing resources 142, a database of probability for recovering resources 143, a database of model of production planned wellbore 151, a database of trajectory planned wellbore 152, a database of hydraulic fracturing plan 153, a database of predicted value for amount of production 161, a database of probability for recovering planned resources 162, a database for constraint of plan 163, and a database of a planned wellbore 171, and these database are referred to by a client terminal 190 through the above-described program.

In addition, in the embodiment, although it is assumed that the data input and output are performed by the client terminal 190, the system for predicting amount of production 100 may have the input and output functions and have devices (a display, a keyboard, and the like), or a plurality of the client terminals 190 may be connected through the network 180.

Figure 5:
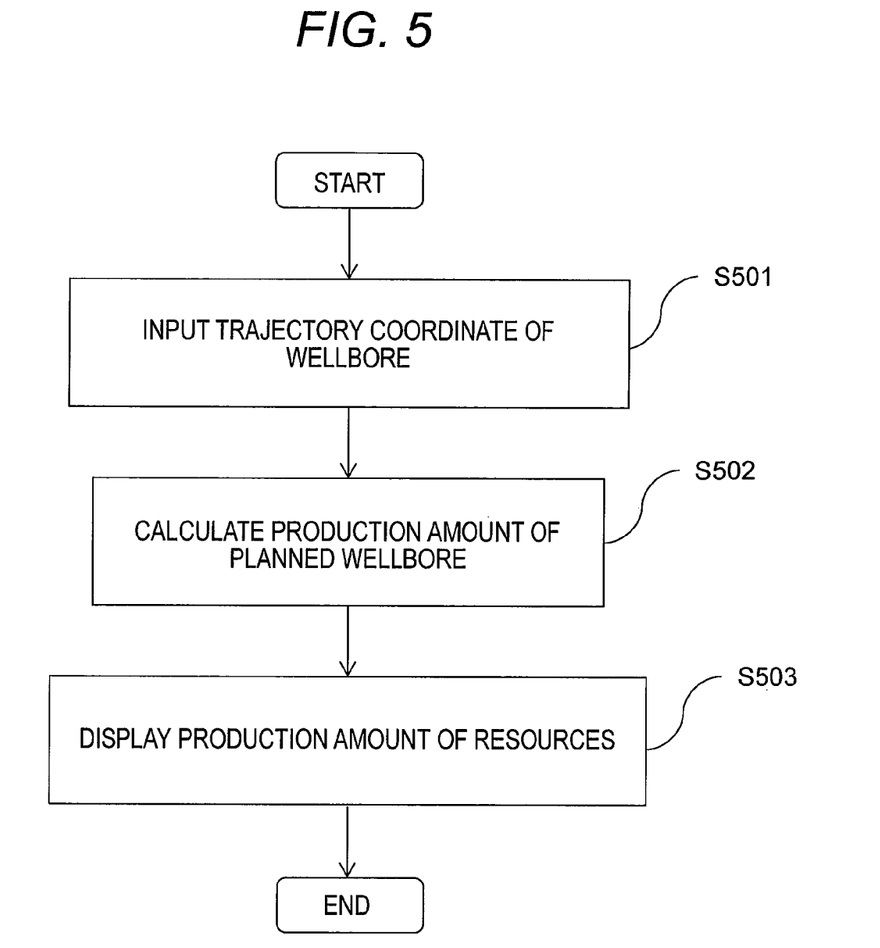
FIG. 5 is a flowchart illustrating the entire processes of a system for predicting amount of production according to the embodiment.

FIG. 5 is a flowchart illustrating whole processes of the system for predicting amount of production 100 according to the embodiment. A production amount prediction model which is based on resources information including a resources amount obtained in a previously drilled wellbore and a resources recovery probability in the vicinity thereof is stored in the storage unit (the database of production model 131, the database of probability for recovering resources 143, and the database of history for amount of production 141).

An input unit (not shown) receives a coordinate of trajectory of a planned wellbore as an input (S501).

The production amount prediction unit (function for estimating amount of production 125) calculates a production amount of the planned wellbore based on the production amount prediction model by using a degree of influence of the previous wellbore on the input planned wellbore as at least one parameter (S502). The degree of influence will be described in detail in the description of (Mathematical Formula 5).

In addition, the production amount prediction unit calculates the degree of influence based on a positional relationship between a coordinate of trajectory of the planned wellbore and a coordinate of trajectory of the previous wellbore. In the case where a coordinate of trajectory of a second planned wellbore which is planned to be newly drilled is input to the input unit, the production amount prediction unit calculates the degree of influence among the wellbores based on a positional relationship among the coordinate of trajectory of the second planned wellbore, the coordinate of trajectory of the just-before input planned wellbore, and the coordinate of trajectory of the previous wellbore and calculates the production amount of the resources of the second planned wellbore.

The display unit (function of visualization 126) displays the production amount of resources of the planned wellbore calculated by the production amount prediction unit (S503).

In addition, in the case of predicting the production amounts of a plurality of the planned wellbores (newly planned wellbores), the following processes are performed.

The input unit receives coordinates of trajectory of the planned wellbores which are being planned as an input (S501).

The production amount prediction unit calculates the production amounts of the resources of the planned wellbores based on the production amount prediction model by using a degree of influence of the previous wellbore on the planned wellbores as at least one parameter (S502).

The display unit displays the production amounts of resources of the planned wellbores calculated by the production amount prediction unit (S503).

The plan constraint database (the database for constraint of plan 163) stores constraints which the coordinate of trajectory of the newly planned wellbore needs to satisfy. When the coordinate of trajectory of the planned wellbore is input, the plan searching function 127 outputs a plurality of candidates of the coordinate of trajectory of the wellbore satisfying the constraints stored in the plan constraint database in the vicinity of the input coordinate of trajectory, and the display unit displays production amount predicted values for the candidates in parallel. At this time, in cooperation with an external wellbore drilling cost simulation program, the plan searching function 127 may receive data of drilling cost for the candidates from the program and display the cost data of the candidates. Subsequently, data stored in the database used by the system for predicting amount of production 100 according to the embodiment will be described.

Figure 2A:
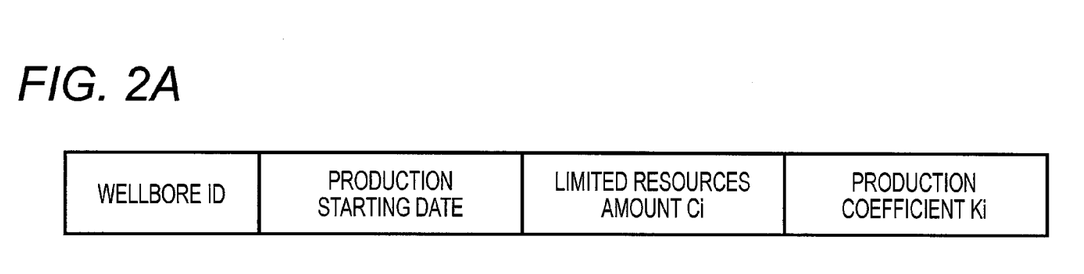
FIG. 2A is a diagram illustrating a record structure of a production model database and a planned wellbore production model database in the embodiment.

The database of production model 131 is a database which is configured with records having, as data fields, wellbore ID, production starting date, and parameters (a limited resources amount $C_i$ and a production coefficient $K_i$) involved in productivity of each wellbore. Initial values of the parameters involved in the productivity are blank and are calculated and set by the function for learning model of production 123. FIG. 2A illustrates a record structure of the database of production model 131.

Figure 2B:
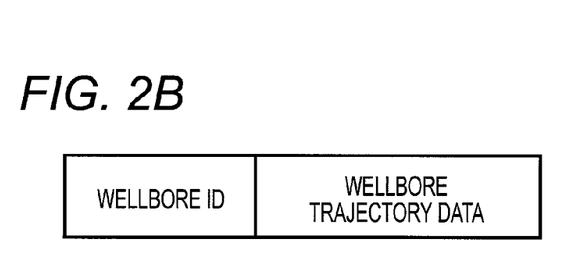
FIG. 2B is a diagram illustrating a record structure of a database for wellbore trajectory in the embodiment.

The database of wellbore trajectory 132 is a database which stores wellbore trajectory coordinates of drilled wellbores and is configured with records having, as data fields, wellbore ID and wellbore trajectory data. The wellbore coordinate of trajectory is 3D coordinate information showing a position of a drill acquired from sensor data during wellbore drilling, and the wellbore trajectory data are configured with an array of wellbore coordinates of trajectory. The initial values of the wellbore trajectory data are blank and are calculated and set by the function for learning model of production 123. FIG. 2B illustrates a record structure of the database of wellbore trajectory 132.

Figure 2C:
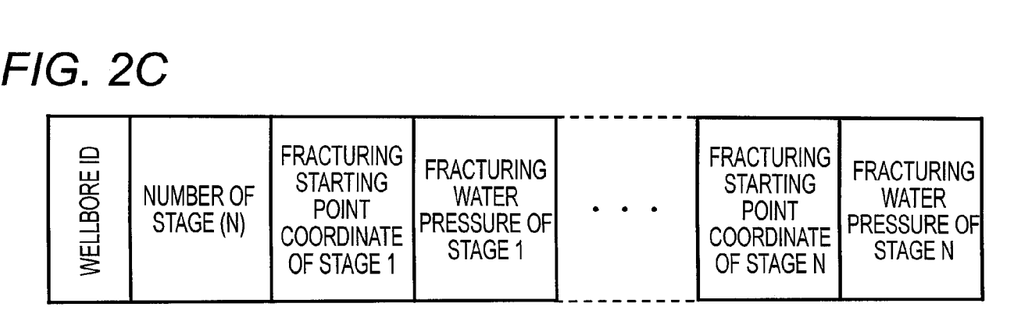
FIG. 2C is a diagram illustrating a record structure of a hydraulic fracturing history database and a hydraulic fracturing plan database in the embodiment.

The database of history of hydraulic fracturing 133 is a database which is configured with records having, as data fields, wellbore ID, the number of hydraulic fracturing stages, a fracturing starting point coordinate of each fracturing stage, and fracturing water pressure. The initial values of the parameters involved in the fracturing are blank and are calculated and set by the function for learning model of production 123. FIG. 2C illustrates a record structure of the database of history of hydraulic fracturing 133.

Figure 2D:
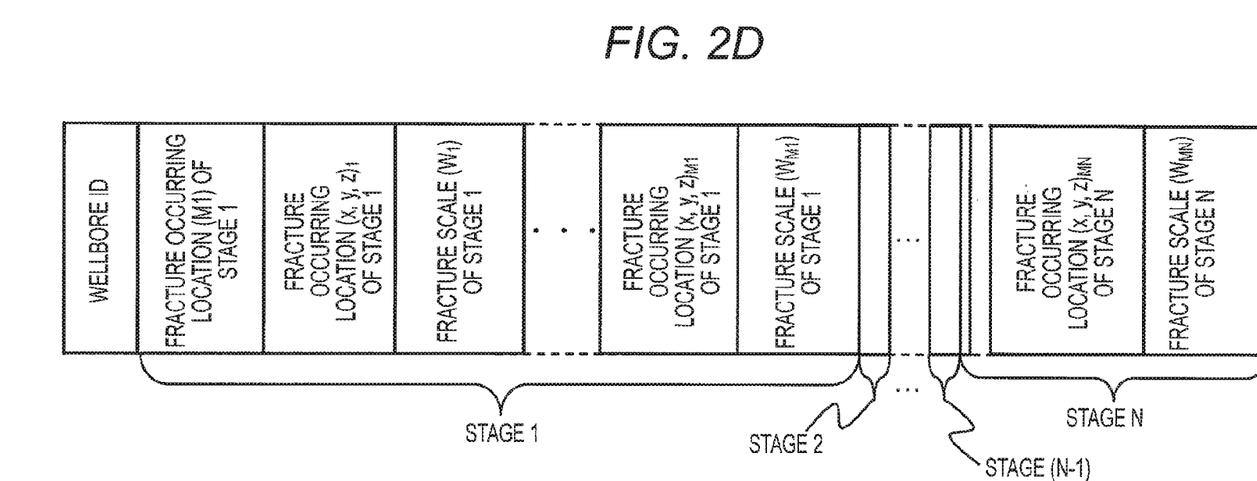
FIG. 2D is a diagram illustrating a record structure of a fracturing state database in the embodiment.

The database for fracturing state 134 is a database which is configured with records having, as data fields, wellbore ID and arrays of the number of subterranean fracture occurring locations occurring at each stage number, a 3D coordinate of actual fracture occurring location in each stage, and a fracture scale of the location, wherein the number of arrays arranged is the number of stages. The initial values of the parameters involved in the fracturing are blank and are calculated and set by the function for learning model of production 123. FIG. 2D illustrates a record structure of the database for fracturing state 134. The fracture location and the fracture scale in each stage are values obtained by a micro-seismic analysis which is developed for a wellbore development process for shale oil developing and which records and analyzes seismic waves generated from the fracture location occurring during hydraulic fracturing.

Figure 2E:
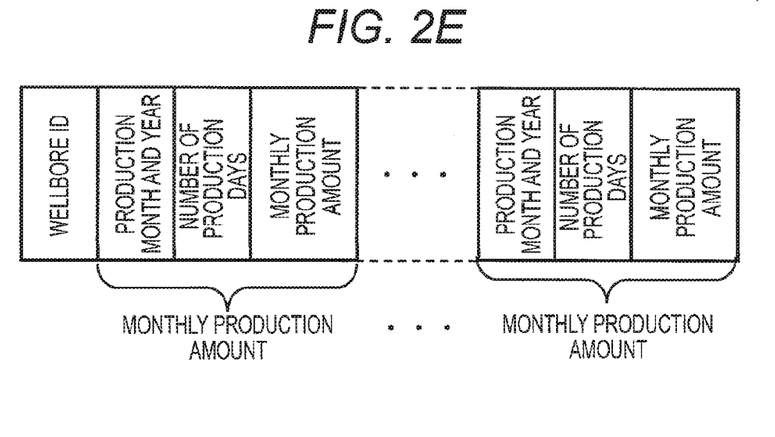
FIG. 2E is a diagram illustrating a record structure of a history database for amount of production in the embodiment.

The database of history for amount of production 141 is a database which is configured with records storing, as data fields, wellbore ID and production month and year, the number of production days per month, and monthly production amount with respect to the wellbore having the wellbore ID from the production starting month to the production ending month or the current date. The initial values of the parameters involved in the productivity are blank and are calculated and set by the function for learning model of production 123. FIG. 2E illustrates a record structure of the production amount database.

Figure 2F:
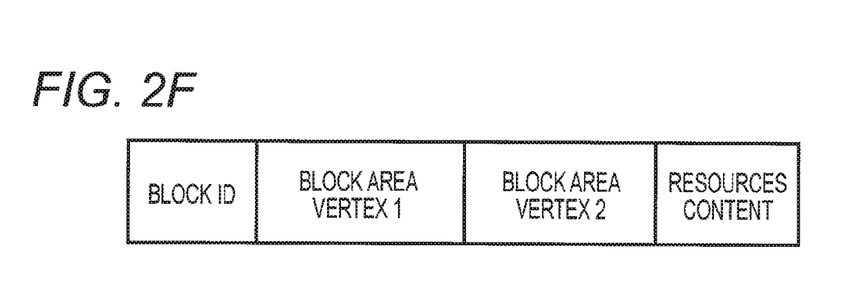
FIG. 2F is a diagram illustrating a recording structure of a database for resources distribution according to the embodiment.
Figure 4:
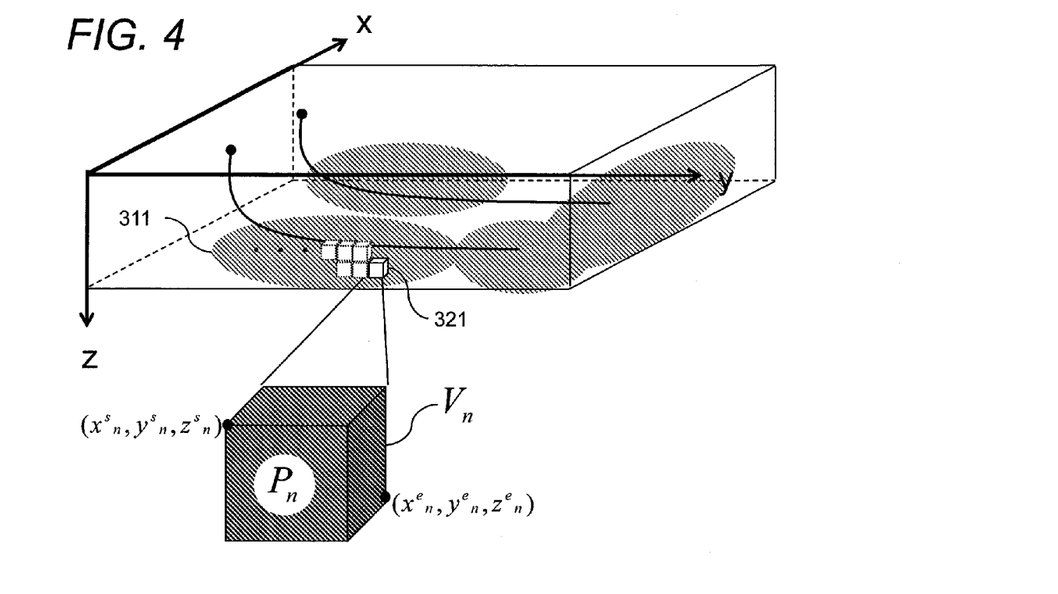
FIG. 4 is a diagram illustrating an example of data representing a resources distribution in the embodiment.

The database for distributing resources 142 is a database which stores subterranean resources distribution information of a wellbore development area. As illustrated in FIG. 4, an subterranean resources distribution area 311 is expressed by a set of rectangular parallelepiped blocks 321 having a predetermined size. The block having a volume $V_n$ is defined as a rectangular parallelepiped block with two diagonal vertices, a block ID (for example, n) is allocated to the block, and an amount of resources existing in the block area is defined as Pn. The initial values of the parameters involved in the block are blank and are calculated and set by the function for learning model of production 123. FIG. 2F illustrates a record structure of the database for distributing resources 142. The record has, as data fields, the block ID, two vertices defining the block area, and the resources amount in the block.

Figure 3:
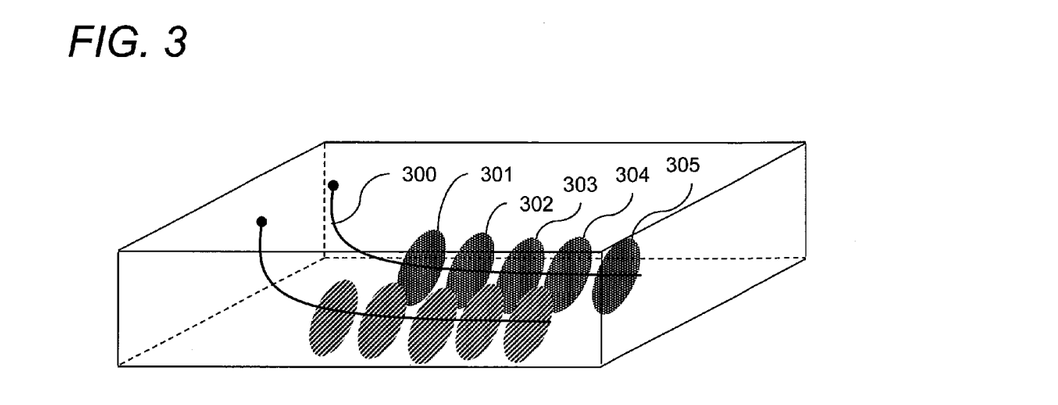
FIG. 3 is a diagram illustrating an example of a mixture of Gaussian distributions of a model for probability of recovering resources according to the embodiment.

FIG. 3 illustrates a resources recovery probability model. In the resources recovery probability model, a probability of absorption of oil resources from a periphery of a fracture occurring in each hydraulic fracturing stage along a wellbore trajectory of a wellbore 300 is approximated by a Gaussian distribution, and the resources recovery probability model is expressed by a mixture of Gaussian distributions 301 to 305 in the hydraulic fracturing stages.

Figure 2G:
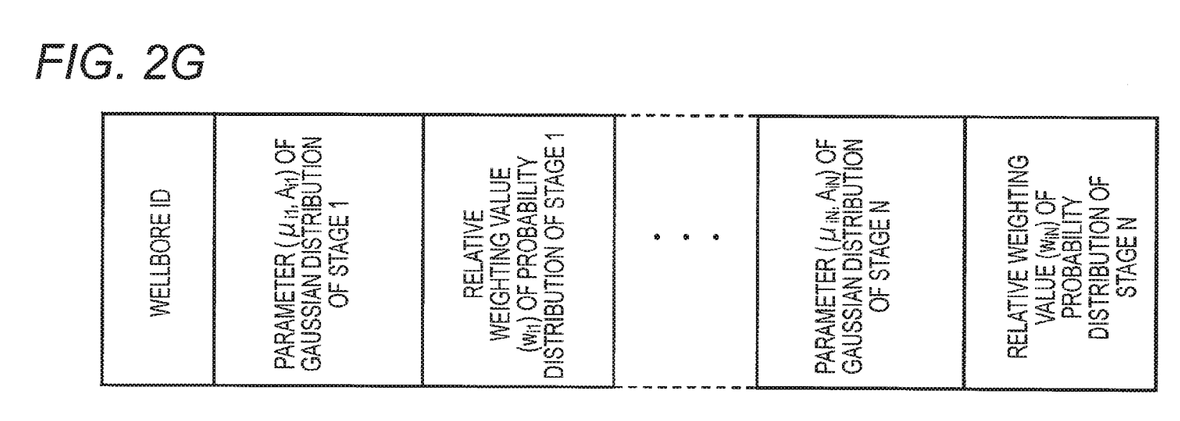
FIG. 2G is a diagram illustrating a record structure of a database of probability of recovering resources and a database of probability of recovering planned resources in the embodiment.

The database of probability for recovering resources 143 is a database which stores, as records, parameters of elementary Gaussian distributions constituting the mixture of Gaussian distributions and a mixing ratio thereof. The initial values of the parameters involved in each stage are blank and are calculated and set by the function for learning model of production 123. FIG. 2G illustrates a record structure of the database of probability for recovering resources 143. The record has a database in which wellbore ID(i), parameters (distribution center position $\mu_{i,j}$, variance-covariance matrix $A_{i,j}$) of the Gaussian distribution in each hydraulic fracturing stage (j) performed on the wellbore, and a relative weighted value ($w_{i,j}$) which is the mixing ratio of the Gaussian distribution to the mixture of Gaussian distributions are arranged in the number of hydraulic fracturing stages. The resources recovery probability distribution occurring at the hydraulic fracturing stage j on the wellbore of which the wellbore ID is i is expressed by the following Gaussian distribution by using the parameters of the Gaussian distribution stored in the database of probability for recovering resources 143.

[Mathematical Formula 1]

$$Pr_i(x, y, z, j \mid \mu_{i,j}, (A_{i,j}), w_{i,j}) = \sum_j w_{i,j} \frac{1}{(2\pi)^{3/2} |A_{i,j}|^{1/2}} \exp\left\{-\frac{1}{2}(r - \mu_{i,j})^T A_{i,j}^{-1}(r - \mu_{i,j})\right\}$$

(Mathematical Formula 1)

in which, $r = (x, y, z)$

The parameters of the mixture of Gaussian distributions are generated by the function for learning model of production 123.

The database of model of production planned wellbore 151 is a database which is configured with records having, as data fields, wellbore ID, a scheduled production starting date, parameters (limited resources amount $C_i$ and production coefficient $K_i$) involved in productivity of each wellbore. A group of the parameters involved in the productivity is calculated and set by the function for interpolationing model of production 124. The database of model of production planned wellbore 151 is the same as the record structure of the database of production model 131 illustrated in FIG. 2A.

The database of trajectory planned wellbore 152 is a database which stores the wellbore coordinates of trajectory obtained by the plan searching function 127 and is configured with records having, as data fields, wellbore ID and wellbore trajectory data. The wellbore trajectory data are configured with an array of 3D coordinates on the wellbore trajectory. The record structure of the database of trajectory planned wellbore 152 is the same as the record structure of the database of wellbore trajectory 132 illustrated in FIG. 2B.

The database of hydraulic fracturing plan 153 is a database which stores planned values of the hydraulic fracturing for each wellbore among the drilling plans stored in the database of trajectory planned wellbore 152. The hydraulic fracturing plan database is configured with records having, as data fields, wellbore ID, the number of scheduled hydraulic fracturing stages, a scheduled fracturing starting point coordinate in each fracturing stage, and a planned value of fracturing water pressure, and the record structure is the same as the record structure of the database of history of hydraulic fracturing 133 illustrated in FIG. 2C.

The database of predicted value for amount of production 161 is a database which is configured with records having, as data fields, wellbore ID and arrays of production month and year, and the number of planned production days per month, and a monthly production predicted value of the wellbore having the wellbore ID from the scheduled production starting month to the scheduled production ending month. The production amount predicted value is generated by the function for estimating amount of production 125. The record structure of the database of predicted value for amount of production 161 is the same as the record structure of the database of history for amount of production 141 illustrated in FIG. 2E.

The database of probability for recovering planned resources 162 is a database which stores, as records, parameters of elementary Gaussian distributions constituting the mixture of Gaussian distributions and a mixing ratio thereof. The record structure of the database of probability for recovering planned resources 162 is the same as the record structure of the database of probability for recovering resources 143 illustrated in FIG. 2G. The parameters and the mixing ratio of the mixture of Gaussian distributions are calculated and set by the function for interpolationing model of production 124.

Figure 2H:
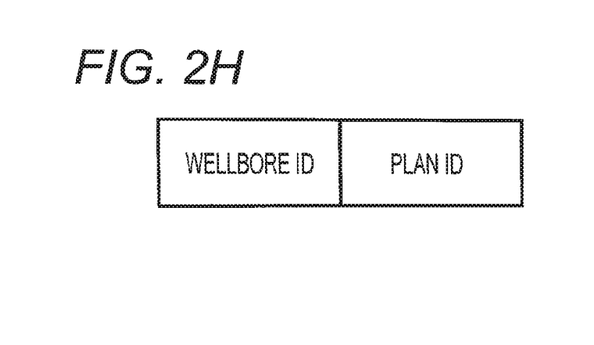
FIG. 2H is a diagram illustrating a record structure of a planned wellbore database in the embodiment.

The database of a planned wellbore 171 is a database which is configured with records having, as data fields, wellbore ID of a wellbore which is planned to be developed and plan ID of a plan which is to be performed on the wellbore, and the record structure is illustrated in FIG. 2H.

[Mathematical Formula 3]

$$A_{i,j} = \frac{1}{\sum_k w_{i,j,k}} \begin{pmatrix} \sum_k w_{i,j,k} \cdot (x_{i,j,k} - \mu_{i,j,1})(x_{i,j,k} - \mu_{i,j,1}) & \sum_k w_{i,j,k} \cdot (x_{i,j,k} - \mu_{i,j,1})(y_{i,j,k} - \mu_{i,j,2}) & \sum_k w_{i,j,k} \cdot (x_{i,j,k} - \mu_{i,j,1})(z_{i,j,k} - \mu_{i,j,3}) \\ \sum_k w_{i,j,k} \cdot (y_{i,j,k} - \mu_{i,j,2})(x_{i,j,k} - \mu_{i,j,1}) & \sum_k w_{i,j,k} \cdot (y_{i,j,k} - \mu_{i,j,2})(y_{i,j,k} - \mu_{i,j,2}) & \sum_k w_{i,j,k} \cdot (y_{i,j,k} - \mu_{i,j,2})(z_{i,j,k} - \mu_{i,j,3}) \\ \sum_k w_{i,j,k} \cdot (z_{i,j,k} - \mu_{i,j,3})(x_{i,j,k} - \mu_{i,j,1}) & \sum_k w_{i,j,k} \cdot (z_{i,j,k} - \mu_{i,j,3})(z_{i,j,k} - \mu_{i,j,2}) & \sum_k w_{i,j,k} \cdot (z_{i,j,k} - \mu_{i,j,3})(z_{i,j,k} - \mu_{i,j,3}) \end{pmatrix}$$

(Mathematical Formula 3)

The database for constraint of plan 163 stores constraint conditions which need to be satisfied by drilling trajectories of newly developed wellbores listed by the plan searching function 127. For example, the plan constraint database store a constraint expression where a curvature of a trajectory has a certain value or less because of the limitation of a drilling technique, a constraint expression where the drilling direction of a horizontal wellbore needs to be included in a predetermined range so that the fracture locations are distributed to be dispersed vertically to the wellbore depending on a distribution of subterranean stress, a constraint expression where a certain depth range is specified so that a horizontal wellbore passes through a shale layer in which resources are intended to be extracted, a constraint expression where a ground position for starting wellbore drilling is specified by specifying a drill pad which is to be used, and the like.

Each function of the system for predicting amount of production 100 according to the embodiment will be described. Each function described hereinafter is operated by executing a program included in the system for predicting amount of production 100.

The function for learning model of recovery 1231 is a function of learning a resources recovery model. Namely, the recovery model learning function is a function of writing data of the fracture location and the fracture scale occurring due to the hydraulic fracturing stored in the database for fracturing state 134 as an input and the parameters of the resources recovery probability expressed by the mixture of Gaussian distributions as an output in the database of probability for recovering resources 143.

The parameters of the resources recovery probability are calculated as follows. A center estimated position $\mu_{i,j}$ of the fracture occurring location is calculated according to the following formula by using the coordinate $(x_{i,j,k}, y_{i,j,k}, z_{i,j,k})$ of the k-th fracture occurring location corresponding to the hydraulic fracturing stage j of the wellbore of which the wellbore ID is i stored in the database for fracturing state 134 and the fracture scale $w_{i,j,k}$ at the fracture occurring location.

[Mathematical Formula 2]

$$\mu_{i,j} = \sum_k w_{i,j,k} \cdot (x_{i,j,k}, y_{i,j,k}, z_{i,j,k}) \Big/ \sum_k w_{i,j,k}$$ (Mathematical Formula 2)

The above formula is a calculation formula of the center estimated position at the fracture occurring location.

In addition, a variance-covariance matrix $A_{i,j}$ is calculated according to the following formula.

The above formula is a calculation formula of the variance-covariance matrix representing the spread of the hydraulic fracturing.

A weighted value $w_{i,j}$ for each hydraulic fracturing stage representing the mixing ratio of the mixture of Gaussian distributions is calculated according to the following formula.

[Mathematical Formula 4]

$$w_{i,j} = \sum_k w_{i,j,k} \Big/ \sum_{j,k} w_{i,j,k}$$ (Mathematical Formula 4)

The above formula is a calculation formula of the mixing ratio of the mixture of Gaussian distributions.

The function for learning model of production 123 is a function of writing the mixture of Gaussian distributions $Pr_i$ representing (Mathematical Formula 1) calculated from the parameters stored in the database of probability for recovering resources 143, the resources distribution data $P_n$ stored in the database for distributing resources 142, and the actual achievement data $U_{i,t}$ of the production amount stored in the database of history for amount of production 141 as an input and the parameters of the production amount prediction formula as an output in the database of production model 131. Herein, the index i is set to the wellbore ID of interest, and the index t of the actual achievement data of the production amount is set to the index of time representing the production month.

It is assumed that the production amount $U_{i,t}$, the resources distribution $P_n$, and the resources recovery probability $Pr_i$ of the wellbore of which the wellbore ID is i satisfy the following relational formula by using the resources recovery limit amount $C_i$ and the production amount conversion coefficient $k_i$ as the parameters of the production model.

[Mathematical Formula 5]

$$U_{i,t} \approx \sum_n k_i(P_n - \Delta P_{n,t} - C_i)\sum_j \int_{V_n} Pr_i(x, y, z, j \mid \mu_{i,j}, A_{i,j}, w_{i,j})\,dxdydz$$

(Mathematical Formula 5)

The above formula is a calculation formula of the production amount.

The relational formula represents that large resources are recovered from the subterranean location having large resources and a high recovery probability. Herein, $\Delta_{n,t}$ in the relational formula of (Mathematical Formula 5) denotes a decrease amount of resources of the volume $V_n$ of the subterranean location n which is decreased by the resources produced from the wellbore i before the production month t of interest as described below.

In (Mathematical Formula 5), the predicted production amount is calculated by calculating the production amount of each stage j in the block n for each wellbore and calculating a sum thereof with respect to the block (fracture location) and the hydraulic fracturing stage (fracture scale) (corresponding to each Σ in Mathematical Formula 5).

According to (Mathematical Formula 5), it can be understood that the production amount in the block is proportional to an integral value of the mixture of Gaussian distributions in the block, the limited resources amount $C_i$, and the production coefficient $K_i$. Among them, the integral value of the mixture of Gaussian distributions is a parameter representing the degree of influence of each block and denotes that, as the parameter becomes large, the large resources are produced from the block. Namely, by using the fracture location and the fracture scale as the parameters of the mixture of Gaussian distributions, the degree of influence between the wellbore can be expressed by the relative weighted value ($w_{i,j}$).

[Mathematical Formula 6]

$$\Delta P_{n,t} = \sum_i \frac{1}{k_i}\left(\sum_{t'=0}^{t-1} U_{i,t} \sum_j \int_{V_n} Pr_i(x, y, z, j \mid \mu_{i,j}, A_{i,j}, w_{i,j})\,dxdydz\right)$$

(Mathematical Formula 6)

The above formula is a calculation formula of the decreased amount of the subterranean localized resources.

The parameters of the production model can be calculated by a numerical method such as a least square method so that the error is minimized when the relational formula of (Mathematical Formula 5) is satisfied by inserting data values of the database of probability for recovering resources 143, the database for distributing resources 142, the database of history for amount of production 141, and the database of production model 131. By representing the production amount in such as model, the phenomenon that, since resources of a certain point are produced at the other wellbore, the production amount of the other wellbore is decreased can be understood.

The function for estimating model planned recovery 1241 is a function of learning a recovery model for planned resources. Namely, the function for estimating model planned recovery 1241 is a function of writing the number of hydraulic fracturing stages, the fracturing starting point coordinate of each fracturing stage, and the fracturing pressure stored in the database of hydraulic fracturing plan 153 as an input and the parameters of the planned resources recovery probability expressed by using the mixture of Gaussian distributions as an output in the database of probability for recovering planned resources 162.

The parameters of the planned resources recovery probability are calculated as follows. First, the center estimated position $\mu_{i,j}$ of the fracture occurring location is defined as a fracturing starting point coordinate value of the stage j of which the wellbore ID stored in the database of hydraulic fracturing plan 153 is i. As described below, with respect to the variance-covariance matrix $A_{i,j}$, isotropy is assumed, and the magnitude of the variance is denoted by $\sigma^2_{i,j}$. Next, a method of obtaining a size of the variance is described.

[Mathematical Formula 7]

$$A_{i,j} = \sigma^2_{i,j}\begin{pmatrix} 1 & 0 & 0 \\ 0 & 1 & 0 \\ 0 & 0 & 1 \end{pmatrix}$$

(Mathematical Formula 7)

The above matrix is a variance-covariance matrix of the planned resources recovery probability distribution.

Figure 6:
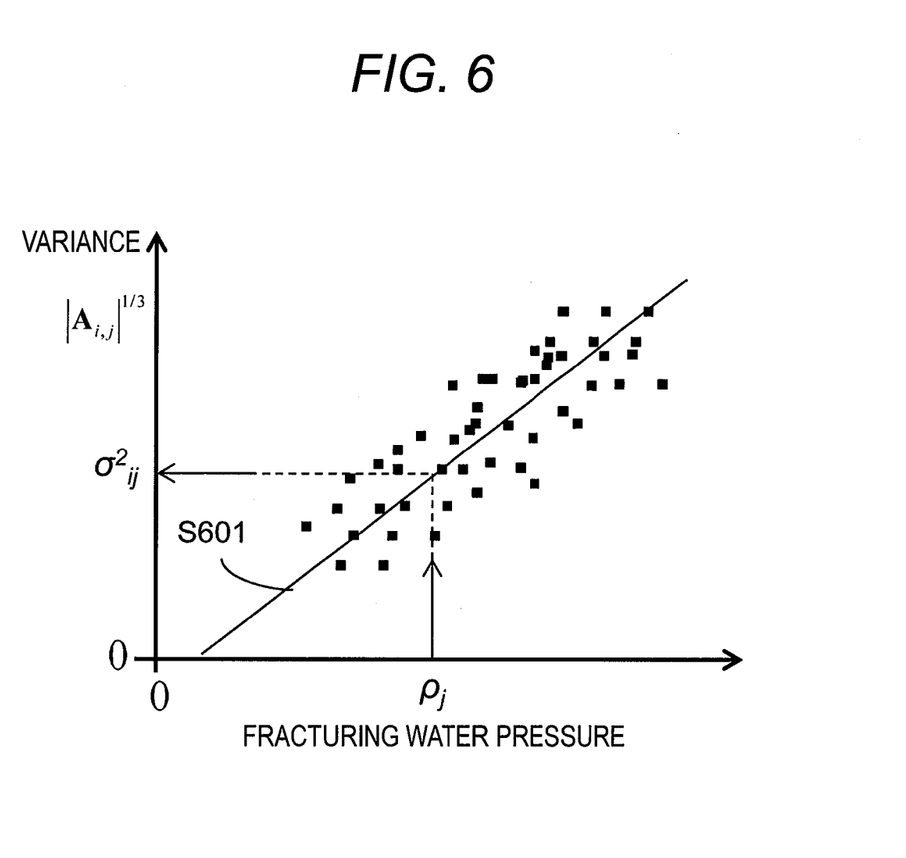
FIG. 6 is a diagram illustrating an example of a correlation between a fracturing water pressure and a variance in the embodiment.

FIG. 6 illustrates a scatter graph where the horizontal axis denotes a fracturing pressure and the vertical axis denotes a variance. In the graph, the fracturing water pressure stored in the database of history of hydraulic fracturing 133 and the magnitude of the variance-covariance matrix $|A_{i,j}|^{1/3}$ of the mixture of Gaussian distributions stored in the database of probability for recovering resources 143 representing the distribution of the fracture locations occurring corresponding to the fracturing are plotted. A linear relationship S601 which approximates the relationship between the fracturing water pressure and the variance is estimated by a least square method. A variance value corresponding to the scheduled fracturing water pressure value stored in the database of hydraulic fracturing plan 153 is obtained by using the linear relationship S601, and the variance value is defined as the variance $\sigma^2_{i,j}$ expressed in the (Mathematical Formula 7), so that the variance-covariance matrix of the mixture of Gaussian distributions stored in the database of probability for recovering planned resources 162 is estimated.

As described below, the relative weighted $w_{i,j}$ of the probability distribution of the hydraulic fracturing stage j is set to the relative ratio of the scheduled fracturing water pressure value $E_{i,j}$. In this manner, the parameters of the mixture of Gaussian distributions stored in the database of probability for recovering planned resources 162 are estimated.

[Mathematical Formula 8]

$$w_{i,j} = \frac{E_{i,j}}{\sum_k E_{i,k}}$$

(Mathematical Formula 8)

The above formula is a calculation formula of the mixing ratio of the mixture of Gaussian distributions representing the planned resources recovery probability distribution.

The function for interpolationing model of production 124 is a function of writing the wellbore trajectory coordinates stored in the database of trajectory planned wellbore 152 as an input and the parameters of the production amount prediction formula as an output in the database of model of production planned wellbore 151.

Figure 7A:
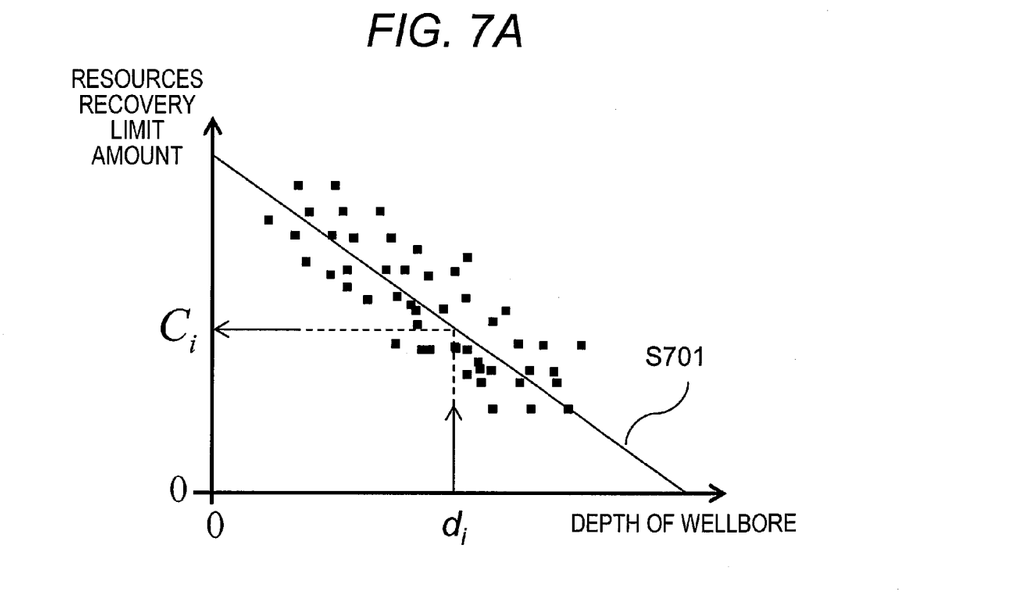
FIG. 7A is a diagram illustrating an example of a correlation between a wellbore depth and an amount of limit for recovering resources in the embodiment.

The parameters of the planned production model are calculated as follows. The resources recovery limit amount $C_i$ of the wellbore of which the wellbore ID is i is obtained from the correlation between a wellbore depth of an existing wellbore and a resources recovery limit amount of the wellbore. As illustrated in FIG. 7A, a scatter graph of the wellbore depth of the existing wellbore and the resources recovery limit amount of the wellbore is plotted. A linear relationship S701 which is best approximate to the correlation between the wellbore depth and the resources recovery limit amount of the wellbore is estimated by using a least square method. Subsequently, the wellbore depth of the wellbore i which is being planned is obtained by referring to the database of trajectory planned wellbore 152, and the resources recovery limit amount $C_i$ of the corresponding wellbore is obtained by using the linear relationship S701.

Figure 7B:
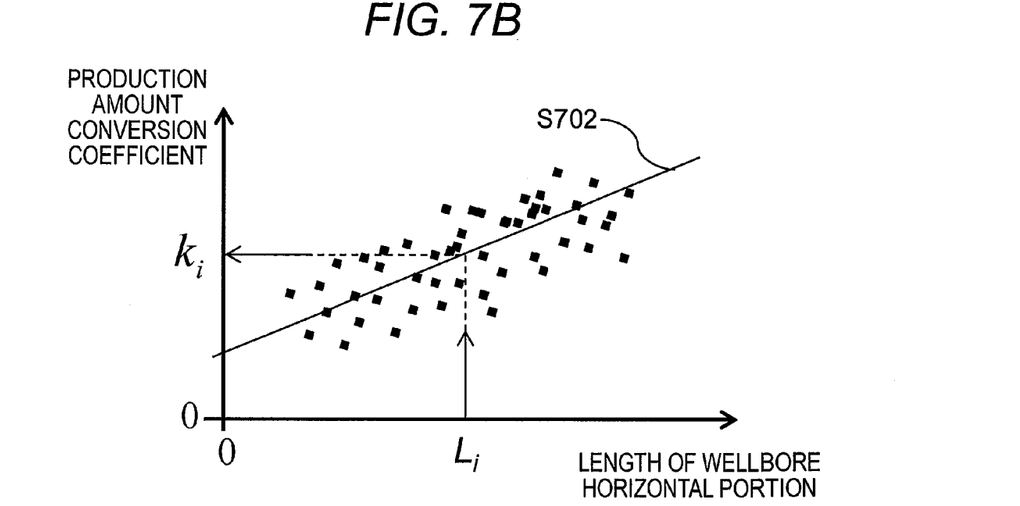
FIG. 7B is a diagram illustrating an example of a correlation between a length of a wellbore horizontal portion and a conversion coefficient of amount of production in the embodiment.

Next, the production amount conversion coefficient $k_i$ is obtained from the correlation between a length of a wellbore horizontal portion of the existing wellbore and a production amount conversion coefficient of the wellbore. First, as illustrated in FIG. 7B, a scatter graph between the length of the wellbore horizontal portion of the existing wellbore and the production amount conversion coefficient of the wellbore is plotted. A linear relationship S702 which is best approximate to the correlation of the scatter graph is estimated by using a least square method. Subsequently, the length $L_i$ of the wellbore horizontal portion of the wellbore i which is being planned is obtained by referring to the database of trajectory planned wellbore 152, and the production amount conversion coefficient of $k_i$ of the corresponding wellbore is obtained by using the linear relationship S702.

The function for estimating amount of production 125 is a function of writing the parameters included in (Mathematical Formula 5) and (Mathematical Formula 6) obtained by referring to the database for distributing resources 142, the database of probability for recovering resources 143, the database of production model 131, the database of probability for recovering planned resources 162, and the database of model of production planned wellbore 151 as an input and the production amount predicted value of a time t after the current time calculated by using (Mathematical Formula 5) and (Mathematical Formula 6) determining the parameter values as an output in the database of predicted value for amount of production 161.

Figure 8:
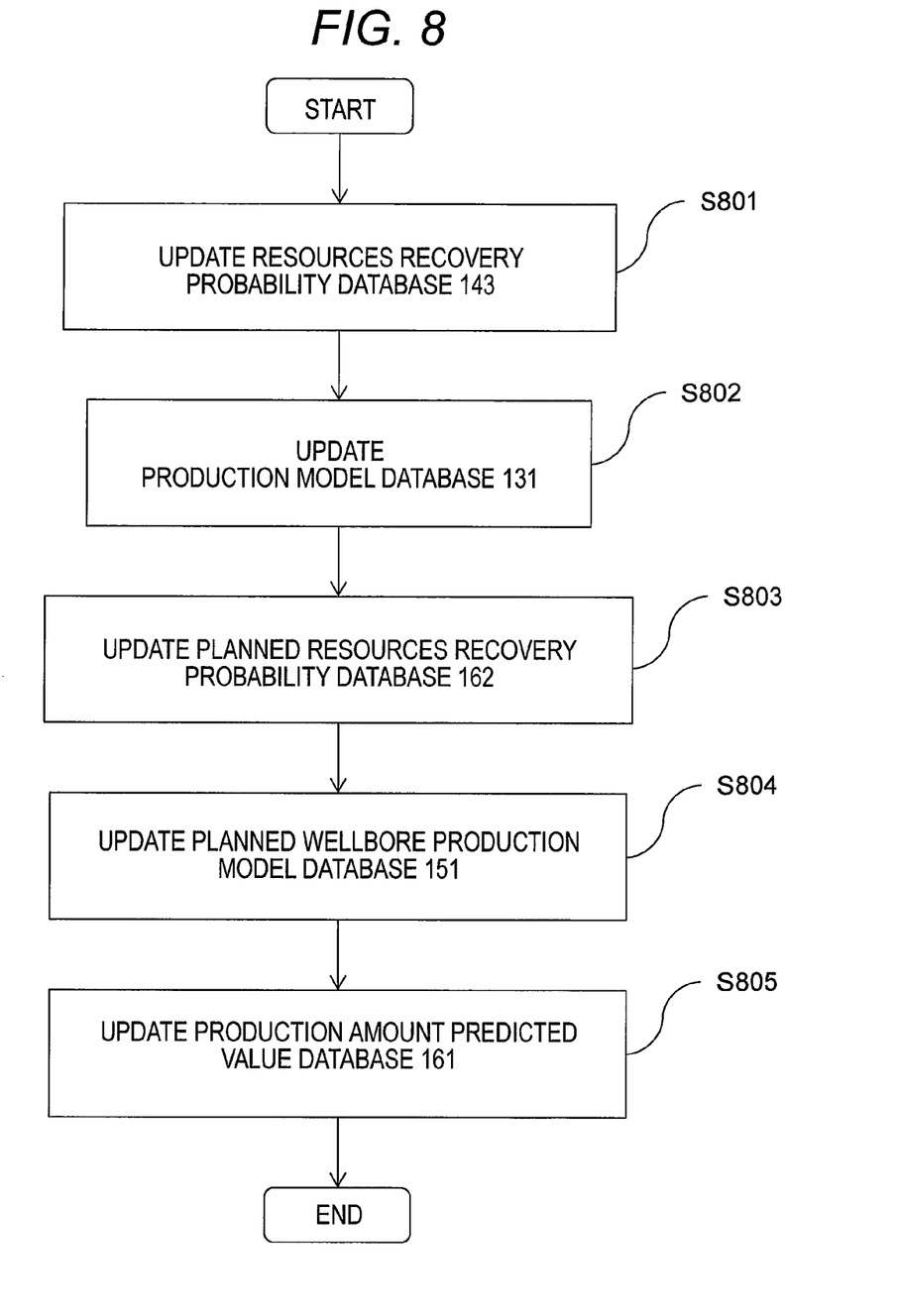
FIG. 8 is a flowchart illustrating an amount of production predicted value updating calculation procedure in the embodiment.

FIG. 8 illustrates a calculation procedure for estimating the production amount predicted value up to a prediction time t before the current time with respect to all the existing wellbore and all the planned wellbores. First, the function for learning model of recovery 1231 calculates the mixture of Gaussian distributions of the resources recovery probability with respect to all the existing wellbores and updates the database of probability for recovering resources 143 (S801). Subsequently, the function for learning model of production 123 calculates the production model parameters with respect to all the existing wellbores and updates the database of production model 131 (S802). Subsequently, the function for estimating model planned recovery 1241 calculates the mixture of Gaussian distributions of the resources recovery probability with respect to all the planned wellbores and updates the database of probability for recovering planned resources 162 (S803). Subsequently, the function for interpolationing model of production 124 calculates the production model parameter with respect to all the planned wellbores and updates the database of model of production planned wellbore 151 (S804). Finally, the function for estimating amount of production 125 calculates the production amount predicted value up to the prediction time t with respect to all the existing wellbores and all the planned wellbores, updates the database of predicted value for amount of production 161, and stores the production amount predicted value estimation calculation (S805).

The calculation procedure for estimating the production amount predicted value illustrated in FIG. 8 is performed by a batch process planned by the client terminal 190, by an execution request according to user's input, or by using the updating of the database of wellbore trajectory 132, the database of history of hydraulic fracturing 133, the database for fracturing state 134, the database of history for amount of production 141, the database for distributing resources 142, the database of trajectory planned wellbore 152, the database of hydraulic fracturing plan 153, the database for constraint of plan 163, or the database of a planned wellbore 171 as a trigger.

The function of visualization 126 uses, as an input, the data stored in the database of a planned wellbore 171, the database of wellbore trajectory 132, the database of trajectory planned wellbore 152, the database for distributing resources 142, the database of history for amount of production 141, and the database of predicted value for amount of production 161 and provides a function of displaying the content of the data in a graphical manner for the better understanding.

Figure 9:
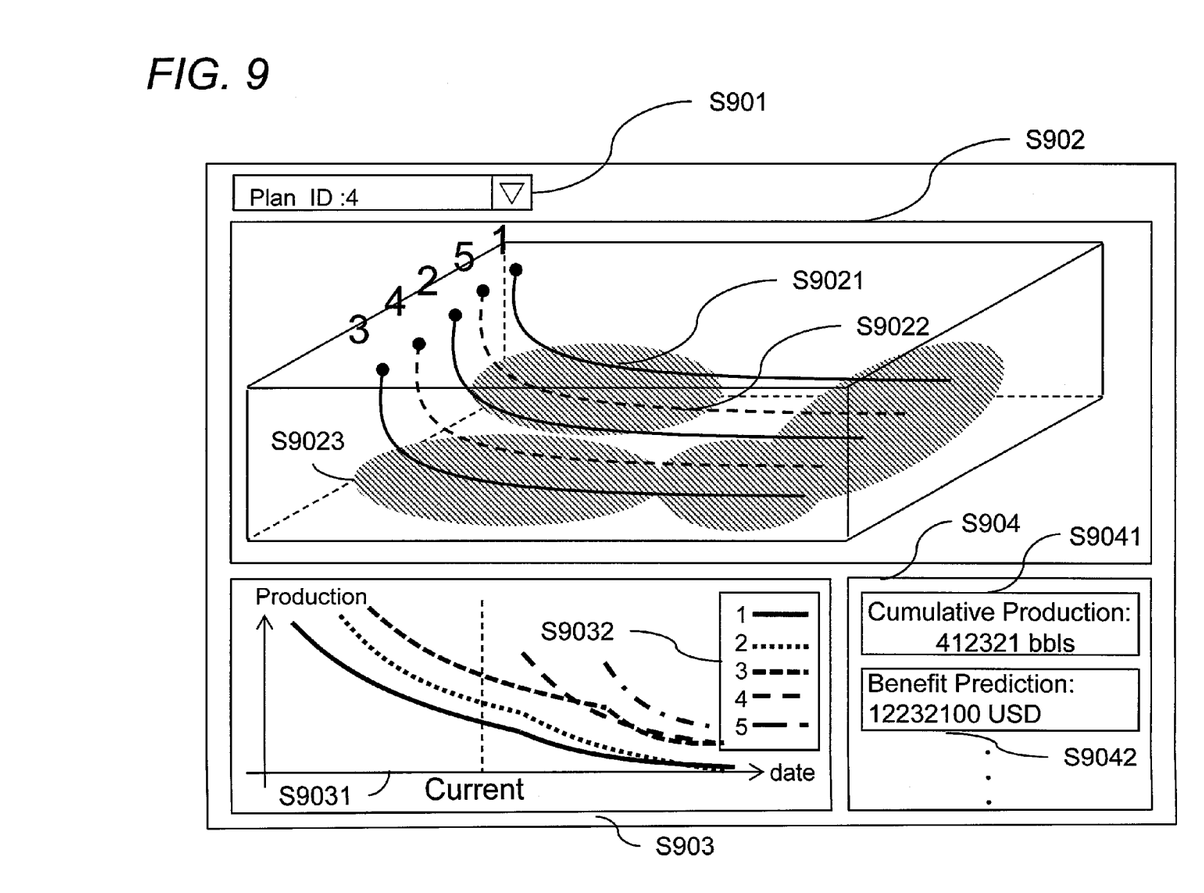
FIG. 9 is a diagram illustrating an example of a screen displayed by a visualization function in the embodiment.

FIG. 9 illustrates an example of a screen displayed by the function of visualization 126. The screen is configured to include a plan ID selecting drop-down list S901, a wellbore trajectory representing portion S902, a production amount graph S903, and an evaluation index representing portion S904.

S901 is a drop-down list for selecting the plan ID. The plan IDs included in the database of a planned wellbore 171 are listed, and the user selects the plan ID, the wellbore trajectory, the production amount, and the evaluation index of S902, S903, and S904 with respect to all the wellbore having the plan ID are visualized.

S902 is a screen for identifying an overview of the wellbore trajectory. S9021 is the trajectory of developed wellbore, and S9022 is an example of the trajectory of the wellbore having the plan ID selected from the plan ID selecting drop-down list S701. With respect to the trajectory of the developed wellbore of S9021, the trajectory coordinates are extracted by referring to the database of wellbore trajectory 132 and the trajectory is represented by a solid line, and with respect to the trajectory of the development planned wellbore in the plan such as S9022, the trajectory coordinates are extracted by referring to the database of trajectory planned wellbore 152, and the trajectory is represented by a broken line so that the trajectory can be distinguished from the trajectory of the developed wellbore. In addition, with respect to the plotted trajectories, the wellbore IDs such as 1 for S9021 and 5 for S9022 are represented on the screen. In addition, the resources content information at each 3D subterranean position is extracted by referring to the database for distributing resources 142, and the recourses content is represented with gradation such as S9023 according to the resources content information of each point so that it can be easy to identify intuitively.

S903 is a screen for identifying the production amount achievement and the predicted production amount for each wellbore. The screen S903 is configured with a graph display portion S9031 and a wellbore ID corresponding display portion S9032. In the graph display portion S9031, the vertical axis denotes a production amount, and the horizontal axis denotes a time (month and year), and the graph display portion displays a change in production amount for each wellbore in each time, that is, the actual achievement value of the production amount up to the current time and the production amount predicted value after the current time. The actual achievement value of the production amount is represented for each wellbore by referring to the database of history for amount of production 141. The production amount predicted value is represented for each wellbore by referring to the database of predicted value for amount of production 161. In the ID corresponding display portion S9032, it is displayed by using explanatory notes which of the wellbore IDs of the wellbore the change in production amount corresponds to.

S904 is a screen of providing an evaluation index for each plan. For example, in S9041, by referring to the production amount of each wellbore included in the database of history for amount of production 141 and the production amount predicted value of each planned wellbore included in the database of predicted value for amount of production 161 and adding the production amount and the production amount predicted value, the predicted value of the sum of the production amounts is displayed. In addition, in S9042, a benefit predicted value is calculated by inserting the total production amount calculated in S9041 into a benefit model formula, and the benefit predicted value to be displayed.

Accordingly, in the course of drilling/development of the wellbore, every time when new data input, change in plan, and addition of a new plan occur, the user identifies the content by using the screen of FIG. 9 so that the user can perform appropriate job decision and business decision.

The plan searching function 127 is a function of receiving, as an input, the constraint expression which the position coordinate of the drilling trajectory of the newly planned wellbore stored in the database for constraint of plan 163 needs to satisfy and semi-automatically listing and displaying the candidates of the drilling trajectory which satisfy the plural constraint expressions. In the case of manually inputting the drilling trajectory of the newly planned wellbore, the 3D coordinates of the wellbore trajectory are input and simultaneously displayed on the wellbore trajectory representing portion S902 in the display screen of the function of visualization 126 by using client terminal 190. At the input trajectory coordinates, the plural constraint expressions stored in the database for constraint of plan 163 are evaluated, and only in the case where the constraints are satisfied, the inputting data are allowed, so that the storing in the database of trajectory planned wellbore 152 is performed. In the case of automatically generating the drilling trajectory of the newly planned wellbore, according to a method such as constraint programming where the constraint expressions stored in the database for constraint of plan 163 are set as conditions, potential drilling trajectory candidates which satisfy the constraints are sequentially listed. The production amount predicted value is automatically calculated based on the listed trajectories according to the calculation procedure for the production amount predicted value illustrated in the FIG. 8, and the information displayed in the function of visualization 126 is updated.

What is claimed is:

1. A computer system for predicting wellbore production comprising:
   a central processing unit (CPU);
   a storage unit, communicatively coupled to the CPU, which stores a production amount prediction model for predicting the wellbore production which is based on resources information including an amount of resources obtained in a previously drilled wellbore and a resources recovery probability of resources in the vicinity thereof;
   an input unit which receives a plurality of trajectory coordinates of a first planned wellbore which is planned to be newly drilled as an input;
   a production amount prediction unit which calculates a production amount of the resources of the first planned wellbore based on the production amount prediction model and the trajectory coordinates by using a degree of influence of the previous wellbore on the first planned wellbore as at least one parameter; and
   a display unit which displays the production amount of the resources of the first planned wellbore calculated by the production amount prediction unit,
   wherein the production amount prediction unit calculates the degree of influence based on a positional relationship between the trajectory coordinates of the first planned wellbore and a plurality of trajectory coordinates of the previous wellbore, and
   wherein, when a plurality of trajectory coordinates of a second planned wellbore which is planned to be newly drilled are input to the input unit, the production amount prediction unit calculates the degree of influence among the wellbores based on a positional relationship among the trajectory coordinates of the second planned wellbore, the trajectory coordinates of the first planned wellbore, and the trajectory coordinates of the previous wellbore and generates a production amount of the resources of the second planned wellbore, wherein the generated production amount of the resources of the second planned wellbore is triggered by an execution request input by a user.

2. A computer system for predicting wellbore production comprising:
   a central processing unit (CPU);
   a storage unit, communicatively coupled to the CPU, which stores a production amount prediction model for predicting the wellbore production which is based on resources information including an amount of resources obtained in a previously drilled wellbore and a resources recovery probability of resources in the vicinity thereof;
   an input unit which receives input of a plurality of trajectory coordinates of a plurality of planned wellbores, including a first planned wellbore which is planned to be newly drilled;
   a production amount prediction unit which calculates a plurality of production amounts of resources of the planned wellbores based on the production amount prediction model and the trajectory coordinates by using a degree of influence of the previous wellbore on the planned wellbores as at least one parameter; and
   a display unit which displays the production amounts of the resources of the planned wellbores calculated by the production amount prediction unit,
   wherein the production amount prediction unit calculates the degree of influence based on a positional relationship between the trajectory coordinates of the planned wellbores and a plurality of trajectory coordinates of the previous wellbore, and wherein, when a plurality of trajectory coordinates of a second planned wellbore are input, the production amount prediction unit calculates the degree of influence among the wellbores based on a positional relationship among the trajectory coordinates of the second planned wellbore, the trajectory coordinates of the first planned wellbore, and the trajectory coordinates of the previous wellbore and generates a production amount of the resources of the second planned wellbore, wherein the generated production amount of the resources of the second planned wellbore is triggered by an execution request input by a user.

3. The computer system for predicting the wellbore production according to claim 2, further comprising:

a plan constraint database which stores constraints which the trajectory coordinates of the planned wellbores are to satisfy; and a plan searching unit which outputs a plurality of trajectory coordinate candidates of the planned wellbores which satisfy the constraints stored in the plan constraint database in the vicinity of the input trajectory coordinates of the planned wellbores, wherein the production amount prediction unit further calculates the production amounts of resources of the planned wellbores based on the trajectory coordinate candidates as the trajectory coordinates, and wherein the display unit displays the production amounts of the resources of the planned wellbores for the trajectory coordinate candidates in parallel.

4. A method for predicting wellbore production comprising:

storing, in a storage unit, a production amount prediction model for predicting the wellbore production which is based on resources information including a resources amount obtained in a previously drilled wellbore and a resources recovery probability of resources in the vicinity thereof;

receiving, from an input unit, a plurality of trajectory coordinates of a first planned wellbore which is planned to be newly drilled as an input;

calculating, by a production amount prediction unit, a production amount of the resources of the first planned wellbore based on the production amount prediction model and the trajectory coordinates by using a degree of influence of the previous wellbore on the first planned wellbore as at least one parameter, the degree of influence being calculated based on a positional relationship between the trajectory coordinates of the first planned wellbore and a plurality of trajectory coordinates of the previous wellbore;

displaying, by a display unit, the production amount of the resources of the first planned wellbore calculated by the production amount prediction unit; and when a plurality of trajectory coordinates of a second planned wellbore which is planned to be newly drilled is input from the input unit, calculating, by the production amount prediction unit, the degree of influence among the wellbores based on a positional relationship among the trajectory coordinates of the second planned wellbore, the trajectory coordinates of the first planned wellbore, and the trajectory coordinates of the previous wellbore and generates a production amount of the resources of the second planned wellbore wherein the generated production amount of the resources of the second planned wellbore is triggered by an execution request input by a user.

\* \* \* \* \*